(12) United States Patent
Vidal et al.

(10) Patent No.: US 9,636,960 B2
(45) Date of Patent: May 2, 2017

(54) SUSPENSION ELEMENT FOR SELF-PROPELLED MACHINE

(75) Inventors: Stephane Vidal, Verberie (FR); Laurent Albert, Verberie (FR)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 46 days.

(21) Appl. No.: 13/425,367

(22) Filed: Mar. 20, 2012

(65) Prior Publication Data

US 2012/0241230 A1 Sep. 27, 2012

(30) Foreign Application Priority Data

Mar. 23, 2011 (FR) ...................................... 11 52421

(51) Int. Cl.
*B60G 3/01* (2006.01)
(52) U.S. Cl.
CPC ........ *B60G 3/01* (2013.01); *B60G 2204/4232* (2013.01); *B60G 2300/083* (2013.01); *Y10T 29/49826* (2015.01)
(58) Field of Classification Search
CPC .......... B60K 7/0007; B60K 2007/0038; B60K 2007/0092; B60K 17/043; B60G 3/01; B60G 2204/30; B60G 2206/91
USPC ....................... 180/291, 65.51, 342, 385, 58; 280/124.125, 124.127
See application file for complete search history.

(56) References Cited

U.S. PATENT DOCUMENTS

| | | | | |
|---|---|---|---|---|
| 3,705,701 A | * | 12/1972 | Hunt .............................. | 248/544 |
| 6,357,770 B1 | * | 3/2002 | Carpiaux et al. ...... | 280/124.127 |
| 6,491,306 B2 | * | 12/2002 | Schaffer ..................... | 280/5.502 |
| 6,814,363 B2 | * | 11/2004 | Fitzgerald ................ | 280/93.512 |
| 7,168,717 B2 | * | 1/2007 | Wubben et al. ........ | 280/124.127 |
| 7,347,295 B2 | * | 3/2008 | Kurata ........................ | 180/65.51 |
| 7,717,443 B1 | * | 5/2010 | Carlson et al. ......... | 280/124.155 |
| 7,938,210 B2 | * | 5/2011 | Kunzler et al. ............ | 180/65.51 |
| 8,424,881 B2 | * | 4/2013 | Vander Zaag et al. .... | 280/6.157 |
| 8,534,686 B1 | * | 9/2013 | Slawson ................ | 280/124.145 |
| 9,278,594 B2 | * | 3/2016 | Horsch .................... | B60G 3/01 |

(Continued)

FOREIGN PATENT DOCUMENTS

| | | |
|---|---|---|
| EP | 1685988 | 8/2006 |
| EP | 2030939 | 3/2009 |

(Continued)

*Primary Examiner* — Emma K Frick
(74) *Attorney, Agent, or Firm* — Blakely Sokoloff Taylor & Zafman LLP (57) ABSTRACT

The invention concerns a suspension element for self-propelled machine comprising:
- a suspension fork (100) secured to the chassis of the machine and comprising two parallel arms (120, 130),
- a motor (400), secured to two sleeves (200, 300) each comprising at least one bearing (210A, 210B, 310A, 310B) adapted to slide in translation on the arms (120, 130), the suspension element being characterized in that the two sleeves (10) (200, 300) are separate parts, the motor (400) comprising a casing (410) adapted to form a supporting frame allowing the ensured rigid connection between the two sleeves (200, 300) and for this purpose comprising connecting means designed to ensure the connection between the supporting frame of the motor and each of the two sleeves over a center distance range of the sleeves while withstanding the forces applied by the chassis on the casing.

17 Claims, 9 Drawing Sheets

(56) References Cited

U.S. PATENT DOCUMENTS

| | | | | |
|---|---|---|---|---|
| 2003/0088943 | A1* | 5/2003 | Neukotter | 16/366 |
| 2003/0090079 | A1* | 5/2003 | Chevillard | 280/124.125 |
| 2008/0060867 | A1* | 3/2008 | Oda et al. | 180/291 |
| 2010/0000811 | A1* | 1/2010 | Iwano | 180/65.51 |
| 2014/0345964 | A1* | 11/2014 | Nakaoka et al. | 180/291 |

FOREIGN PATENT DOCUMENTS

| | | |
|---|---|---|
| EP | 2058154 | 5/2009 |
| FR | 2926492 | 7/2009 |

\* cited by examiner

SUSPENSION ELEMENT FOR SELF-PROPELLED MACHINE

FIELD OF THE INVENTION

The subject of the present invention generally concerns the suspension parts of self-propelled machines of which at least one and even each wheel is driven in rotation by an individual hydraulic motor carried by a suspension fork.

The invention may be applied in particular to the field of agricultural machines such as sprayers or straddle-type tractors.

STATE OF THE ART

Suspension parts are already known for self-propelled machines, which give support to a hydraulic motor driving a wheel in rotation.

These suspension parts generally comprise a suspension fork, the fork being secured to the chassis of the machine and comprising parallel arms, the suspension element also comprising a sliding frame mounted in translation on the arms, connected to the suspension fork by a damping member, which ensures suspension and transmits mechanical forces from the chassis to the sliding frame.

This frame is a rigid, robust element on which the motor is assembled which drives the wheel in rotation, and it comprises sleeves adapted to slide on the arms of the suspension fork.

These suspension elements raise numerous problems. First they are particularly heavy to handle. For example a sliding frame of an agricultural machine on which a hydraulic motor is assembled may weigh more than 80 kg. On this account, any maintenance or replacement operation of a part gives rise to numerous difficulties.

Additionally, it is very difficult to obtain perfect parallelism between two elements such as arms or sleeves, and it is also difficult to ensure the same spacing between two arms and two sleeves so as to obtain perfect sliding of the sleeves on the arms.

In fact there are always discrepancies in the spacing or parallelism of the arms or sleeves. To guarantee good sliding of the frame on the arms it is necessary to provide for a clearance between the frame sleeves and the arms, this clearance allowing these spacing discrepancies to be offset.

For example, good sliding requires clearance of the order of one tenth of a millimeter. Yet the tolerance for spacing of the arms may exceed this value and may be several tenths of a millimeter.

To guarantee proper mounting, said assembly requires a clearance between the sleeves and the arms ranging from twice to five times the clearance required for good sliding.

There is therefore a need for a robust suspension element that is easy to handle, capable of withstanding the mechanical forces applied by the chassis of the machine to the casing of the motor, and of solving the difficulty related to sliding on arms whose relative spacing is marred by major assembly discrepancy.

It is therefore one objective of the present invention to solve the aforementioned problems.

In this respect, the invention proposes a suspension element for self-propelled machine, comprising:
- a suspension fork secured to the chassis of the machine and comprising two parallel arms,
- a motor secured to two sleeves, each comprising at least one bearing adapted to slide in translation on the arms, the suspension element being characterized in that the two sleeves are separate parts, the motor comprising a casing adapted to form a supporting frame allowing an ensured rigid connection between the two sleeves and for this purpose comprising connecting means designed to ensure the connection between the supporting frame of the motor and each of the two sleeves over a center distance range of the sleeves whilst supporting the forces applied by the chassis on the casing.

Advantageously, but optionally, the invention comprises at least one of the following characteristics:
- the arms of the suspension element are centered on parallel axes, and the suspension element further comprises a part extending between the two sleeves over a center plane P2 perpendicular to the axes of the arms, and having a main dimension along an axis Y-Y contained within this plane P2 and perpendicular to the two sleeves, the said part being assembled to the two sleeves by assembly means comprising at least one oblong hole allowing assembly by bolting to at least one of the sleeves over a second center distance range of the sleeves, and the said part forming a pre-positioning element for the sleeves;
- each oblong hole of the assembly means of the pre-positioning part on the sleeves is positioned on the pre-positioning part;
- the sleeves of the suspension element have at least one projecting support plate comprising at least one surface perpendicular to the axis X-X, the said plate forming a support for the pre-positioning part;
- each sleeve of the suspension element comprises two slide bearings and two projecting support plates able to form a support for the pre-positioning part, each support plate being positioned at the slide bearings;
- the assembly means for the pre-positioning part on the sleeves comprise at least one hole located on each support plate of the sleeves, allowing the assembly by bolting of the sleeves onto the pre-positioning part;
- the slide bearings of the sleeves are located at the ends of the sleeves, and each sleeve has a circular cross-section whose outer diameter varies longitudinally along the sleeve, the said outer diameter being larger at the ends than in the middle of the sleeve, so that the sleeve is flared at its end parts;
- the suspension element further comprises a damping member connecting the suspension fork and at least one of the parts of the suspension element;
- the damping member connects the suspension fork to the pre-positioning part;
- each sleeve is secured to a supporting part of the motor comprising an assembly surface with the motor casing, the said motor supporting part being connected to the sleeve via at least one bridge;
- the assembly surface of the motor supporting part extends over a plane oriented at an angle α relative to a plane P1 defined by axes on which the fork arms are respectively centered;
- each motor supporting part is connected to a sleeve by two bridges of different lengths, or each motor supporting part is connected to a sleeve via two bridges of equal lengths and has two different thicknesses at the connecting points of the two bridges, thereby allowing the tilting of the said surface at an angle α relative to the plane P1.

The invention also concerns a self-propelled machine comprising at least one suspension element according to preferred embodiments of the invention.

The invention further concerns a method for assembling a suspension element for self-propelled machine, comprising the steps of:
- bringing two sleeves onto two parallel arms of a suspension fork;
- adjusting the positioning and orientation of each sleeve around the arm on which it is positioned, so that the two sleeves are in a symmetrical position relative to a plane P3 perpendicular to a plane P1 defined by axes on which the parallel arms are respectively centered, the plane P3 lying between the arms at equal distance from each thereof, the support plates of the sleeves being positioned towards plane P3,
- securing the two sleeves, without tightening, by assembling them onto a pre-positioning part;
- securing a hydraulic motor, without tightening, onto each of the two sleeves;
- tightening the securing of the motor on the sleeves so as to allow transmission of forces from the chassis of the machine to the motor casing when the machine is in operation;
- achieving definitive tightening of the pre-positioning part on the sleeves at a torque allowing its definitive holding in position so as to preserve the memory of the positioning of the sleeves.

Advantageously, but optionally, the method of assembling a suspension element for self-propelled machine may also comprise a step at which the motor is temporarily removed to conduct maintenance, the pre-positioning part being held in place during maintenance thereby maintaining the adjustment of the positioning of the sleeves.

DESCRIPTION OF THE FIGURES

Other characteristics, objectives and advantages of the present invention will become apparent on reading the following detailed description, with reference to the appended figures given as non-limiting examples, in which:

FIGS. 4a and 4c illustrate the integration of a suspension element according to two embodiments of the invention into the wheel of a self-propelled machine, while

DETAILED DESCRIPTION OF THE FIGURES

The suspension element according to the present invention can equip self-propelled machines such as agricultural machines (straddle tractors, sprayers etc.) or more generally any self-propelled machine provided with at least three wheels of which at least one can be equipped with a said suspension element (for example vineyard machines).

Figure 1A:
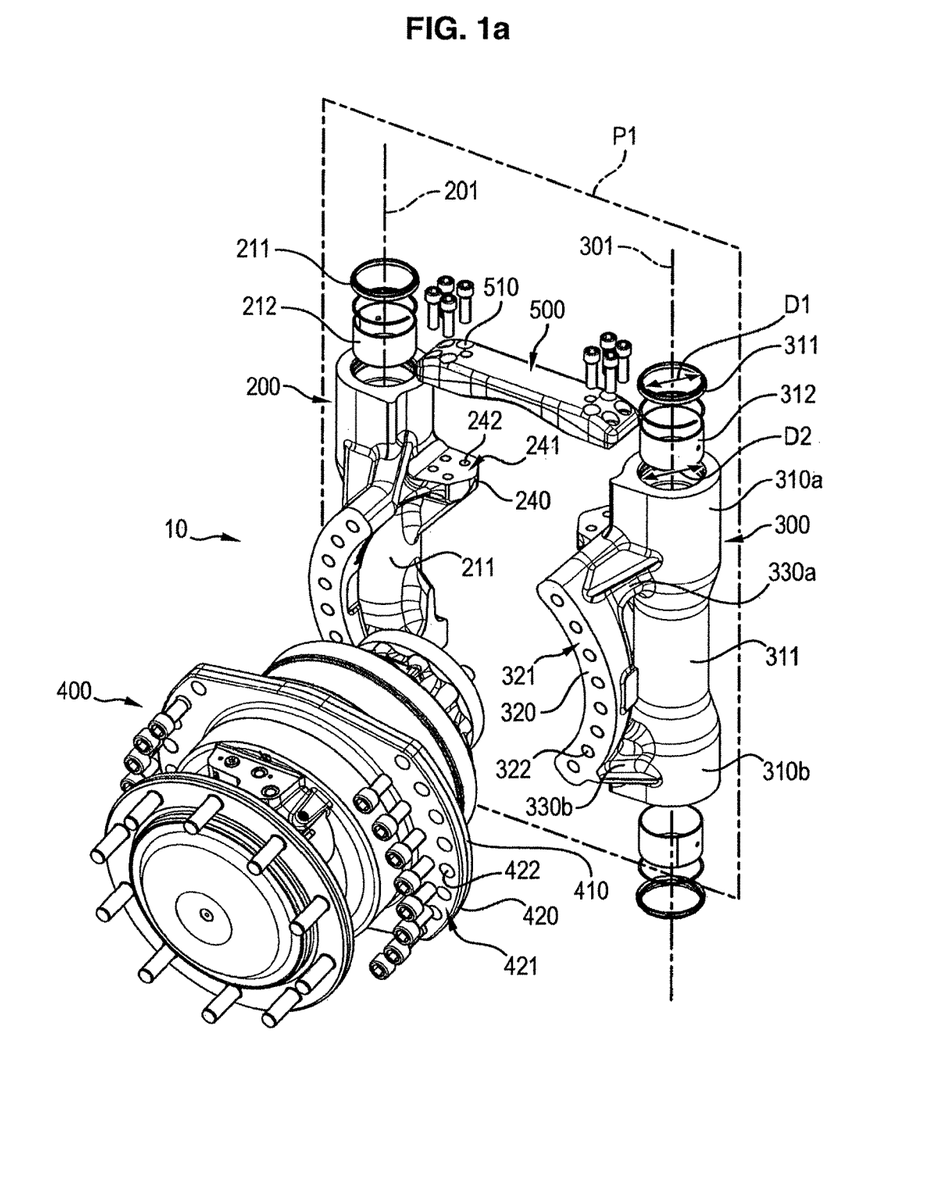
FIG. 1a is an exploded view of a partial suspension element according to one embodiment of the invention.
Figure 1B:
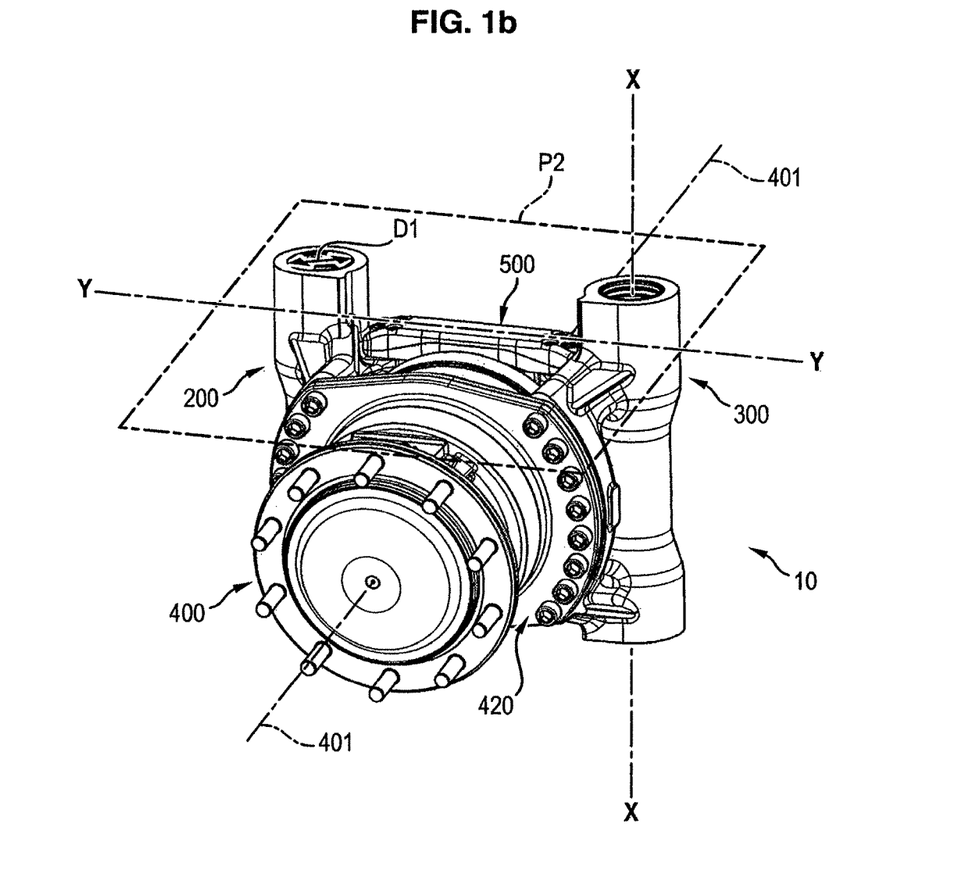
FIG. 1b illustrates a partial suspension element assembled according to one embodiment of the invention.

With reference to FIGS. 1a and 1b, a suspension element 10 is shown according to one preferred embodiment of the invention.

According to the invention, this suspension element 10 preferably comprises:
- a suspension fork 100 (illustrated in FIG. 7) provided with two cylindrical arms 120 and 130, centered on respective parallel axes 121, 131, contained in a plane P1,
- two cylindrical sleeves 200, 300 centered on respective axes 201 and 301, the sleeves being adapted to slide on the cylindrical arms 120 and 130 respectively;
- a motor 400, for example a hydraulic motor secured to the two sleeves 200, 300 and adapted to drive in rotation the wheel of the self-propelled machine on which the suspension element is positioned.

Figure 2:
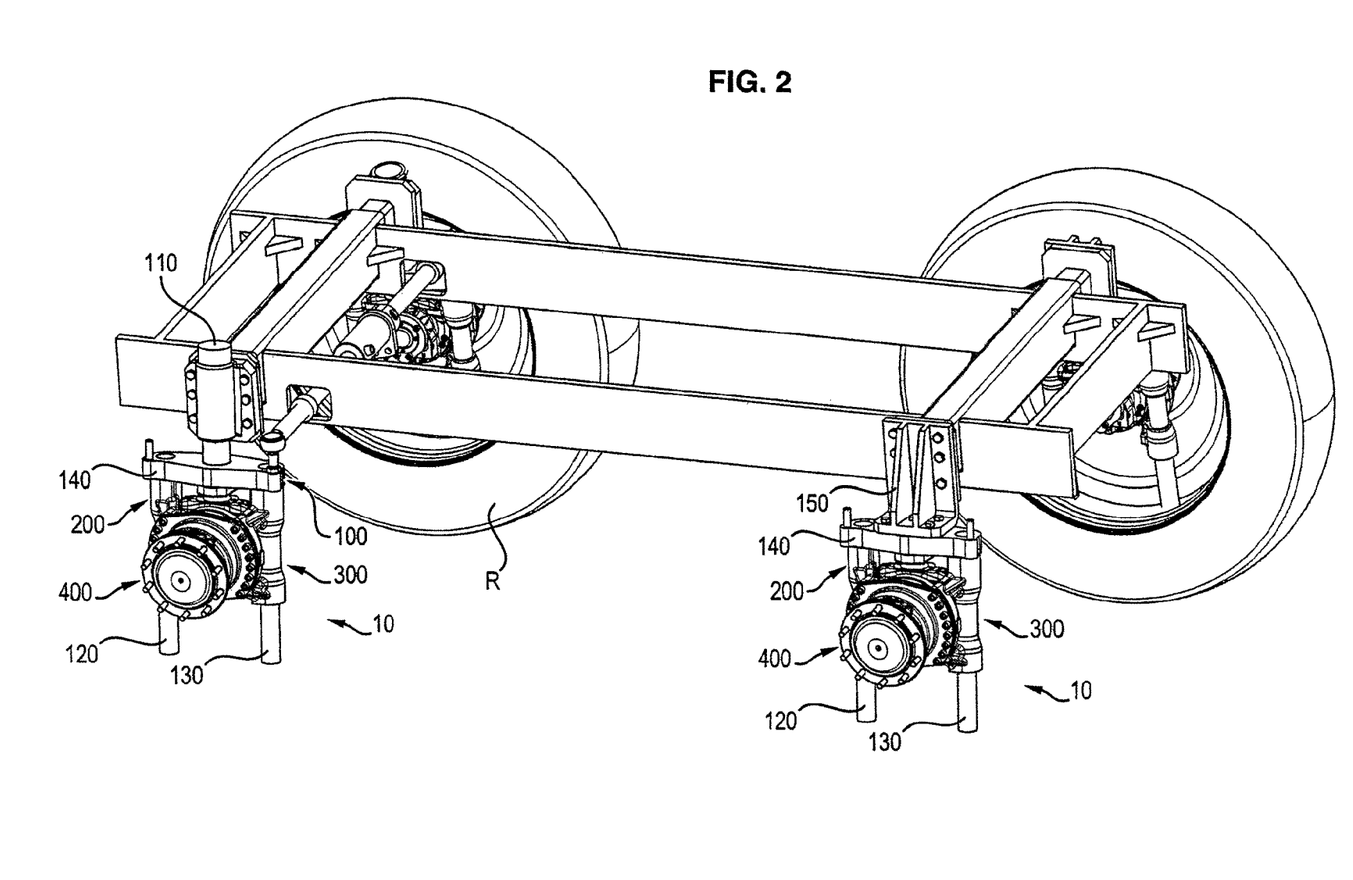
FIG. 2 illustrates examples of installation of suspension elements according to the invention on the chassis of a machine.

The suspension fork 100 is secured to the chassis of the machine as illustrated in FIG. 2.

If the suspension element 10 is installed on a steerable wheel, the suspension fork 100 comprises a shaft 110 which allows the transmission of steering to the wheels via the motor 400 and the sleeves 200 and 300.

The shaft 110 of the fork is preferably parallel to the axes 121, 131 of the cylindrical arms 120, 130. It is also secured firstly to the chassis of the machine and secondly to a transverse element 140 in which the cylindrical arms 120, 130 are inserted and held in parallel position.

The shaft 110 is fixed to the center of the element 140 transverse to it. It is positioned on the side of this element 130 opposite the arms 120, 130. The steering movements are transmitted to the wheels by rotation of the shaft 110 about its axis.

If the suspension element 10 is installed on a wheel that is not a steerable wheel, the shaft 110 is replaced by a retaining plate 150 secured to the transverse element 140 and to the chassis of the machine.

The two sleeves 200 and 300 come to slide on the cylindrical arms 120, 130 of the fork 100.

According to a first embodiment, the sleeves 200 and 300 have an inner cylindrical surface, centered on the axes 201, 301 of the sleeves 200, 300, and of inner diameter D1 equal to the outer diameter of the cylindrical arms 120, 130, with added clearance to permit sliding. This clearance is of the order of 0.1 mm for example, for an outer diameter of the cylindrical arms 120, 130 of 80 mm. Therefore, once the sleeves are positioned on the arms 120, 130, the axes 201, 301 of the sleeves are coaxial with the axes 121, 131 of the arms and are contained in the plane P1 with provision for sliding clearance between the arms and the sleeves.

Alternatively, each sleeve 200 (respectively 300) may have at least one slide bearing 210A (respectively 310A), preferably located at one end of the sleeve. Preferably, each sleeve has two slide bearings 210A and 210B (resp. 310A and 310B), located at the two ends of the sleeves.

Each slide bearing has a seat formed in the sleeves 200, 300, of inner diameter D2 greater than D1 so as to house a seal 211 for example (resp. 311), and/or a friction pad 212 (resp. 312) i.e. a ring in metal or synthetic material suitable for friction and of conjugate diameter, to the nearest required sliding clearance, with the outer diameter of the arms 120, 130, allowing friction forces to be withstood. For example, for arms 120, 130 of diameter 80 mm, the inner diameter D2 of the sleeves at the bearings may be 85 mm, and the pad may have a thickness of the order of 2.5 mm to the nearest tenth of a millimeter to allow sliding clearance. This additional part (seal or pad) can be replaced more easily and at lower cost than a sleeve and therefore simplifies the maintenance of the suspension element.

Between the two slide bearings 210A and 210B (respectively 310A and 310B), the sleeves may have an inner diameter of between D1 and D2. If the inner diameter of the sleeves is smaller than D2, a part can be added such as a retaining tube to hold the friction pads 212, 312 in position at the bearings 210, 310.

According to the invention, the two sleeves 200 and 300 are separate parts and they are secured to each other by assembly with the motor 400.

This facilitates the assembly of the suspension element 10 since the two sleeves 200, 300 can be handled separately, which reduces the weight of the parts to be handled.

Each sleeve 200 (resp. 300) is secured to a part 220 (resp. 320) supporting the motor 400, preferably made in one piece with the sleeve, or alternatively mechanically welded thereto, and being connected thereto by at least one bridge 230 (resp. 330), also preferably made in one piece with or alternatively mechanically welded to the sleeve. Each bridge 230 (resp. 330) can be substantially perpendicular to the plane P1, or more generally it may be perpendicular to the axis 121 (resp. 131) of the arm 120 (resp. 130).

In addition, as non-limiting example, each supporting part 220, 320 is in the shape of an arc of a circle, whose angular extension may be 90° for example, Each supporting part also has a bearing surface 221 (resp. 321) described in more detail below, this bearing surface possibly being parallel to the plane P1, or as a variant inclined relative to P1 by an angle α also described in the remainder hereof.

Advantageously if each sleeve 200, 300, at its two ends, has two slide bearings 210A, 210B or 310A, 310B the bridges 230, 330 can be positioned at the slide bearings.

The bridges 230, 330 and the slide bearings 210A, 210B (resp. 310A, 310B) are sized so that they can withstand mechanical forces such as the weight of the chassis, the tensile force of the wheel and the forces transmitted by the chassis of the machine including steering forces for example. The outer diameter of the bearings 210A, 210B (resp. 310A, 310B) is preferably adapted to ensure sufficient robustness thereof. For this purpose, the thickness of a slide bearing, defined by the difference between the outer diameter and inner diameter D2 can be of the order of 40 to 45 mm.

Since it is the slide bearings 210A, 210B (resp. 310A, 310B) which withstand the mechanical forces, the part of the sleeve 211 located between these bearings may be less robust.

This intermediate part 211 (resp. 311) simply has the function of ensuring the connection between the two end parts, here the slide bearings 210A, 210B (resp. 310A, 310B).

Figure 3A:
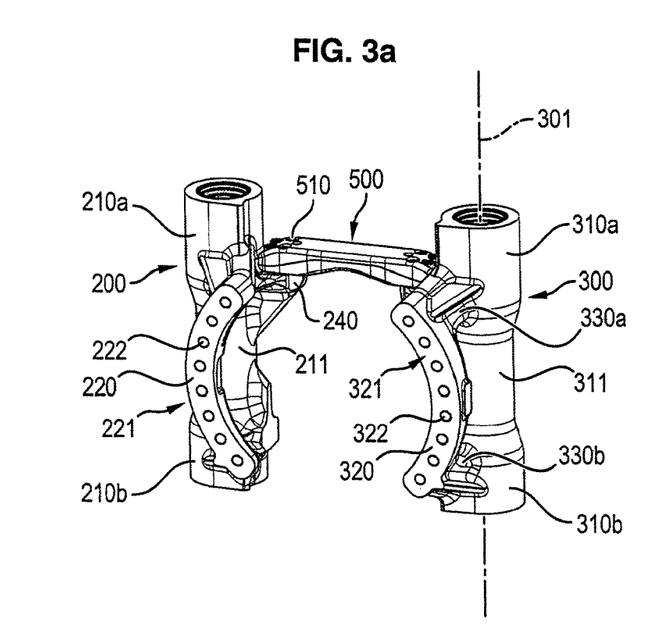
FIGS. 3a and 3b illustrate two types of sleeves of the suspension element according to the invention.
Figure 3B:
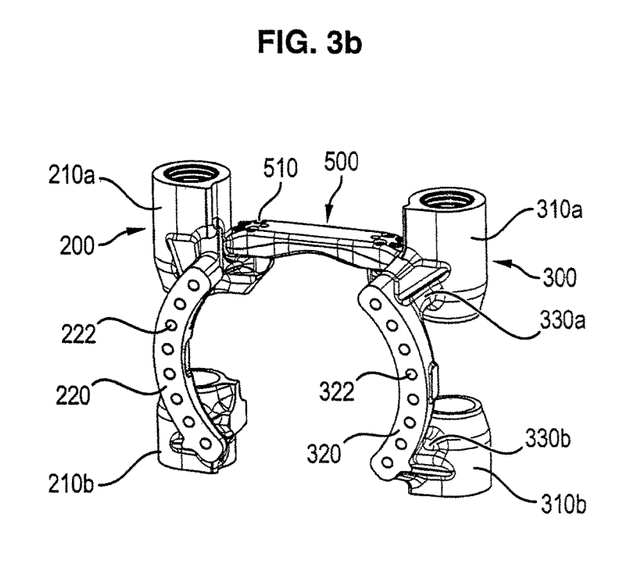

With reference to FIGS. 3a and 3b, it is possible to reduce the outer diameter of the sleeve at this intermediate part, so that the sleeve is flared at its ends as in FIG. 3a. For example the thickness at this level 211 may be of the order of 20 mm.

Figure 5A:
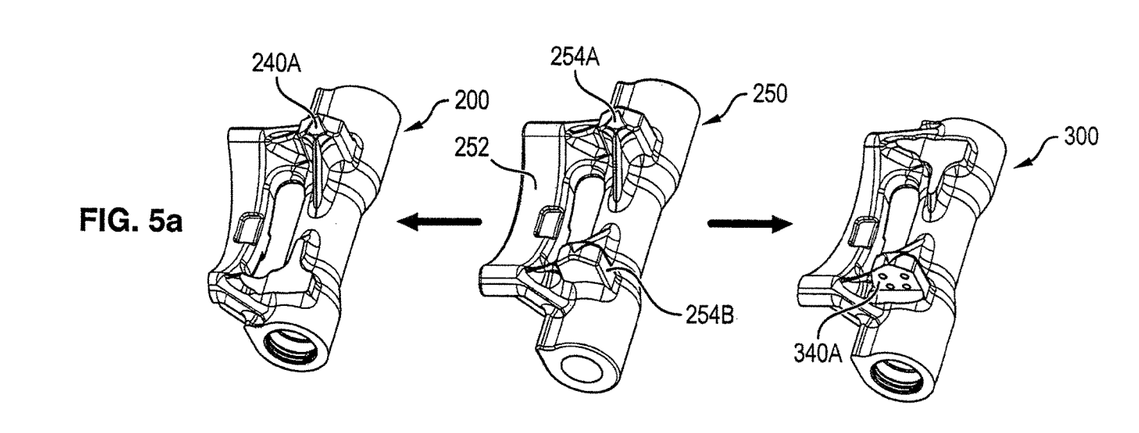
FIGS. 5a and 5b illustrate two types of sleeves of the suspension element, before and after the machining steps, according to one particular embodiment of the invention.
Figure 5B:
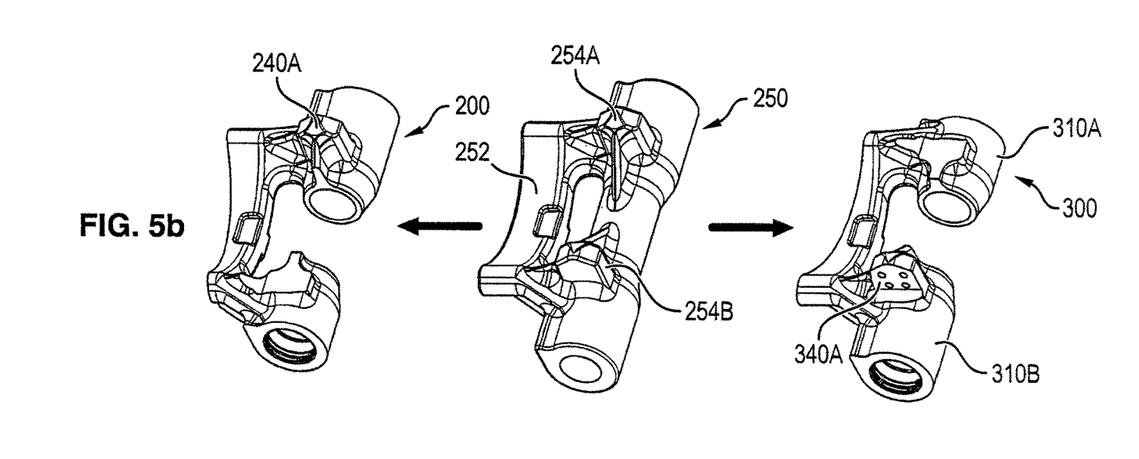

It is even possible according to one variant, to fully eliminate the part 211 (resp. 311) of the sleeve 200 (resp. 300) between the two ends, which imparts a major weight reduction to the structure. This arrangement is illustrated in FIGS. 3b and 5b. In this latter figure it can be seen that an intermediate part 211 is formed on the crude foundry sleeves but is eliminated in the course of machining.

With this arrangement, the two bearings 210A and 210B (resp. 310A and 310B) are nevertheless held secured to each other by means of the bridges 230A and 230B (resp. 330A and 330B) and the motor supporting part 220 (resp. 320), and the sleeve 200 (resp. 300) is considered as the assembly of the two slide bearings secured by the bridges and the motor supporting part.

With reference again to FIGS. 3a and 3b, the part 220 (resp. 320) is illustrated of the sleeve 200 (resp. 300) forming a support for the motor 400. This supporting part advantageously comprises an assembly surface 221 (resp. 321) with the casing 410 of the motor 400.

This assembly surface 221 (resp. 321) for this purpose has a plurality of holes 222 (resp. 322) perpendicular to it, allowing assembly by bolting with the motor 400.

The number of holes 222 (resp. 322) is determined by the number of bolts which must be sufficient to best withstand the forces transmitted by the motor and chassis of the machine. There are two at least, and preferably at least four e.g. eight. They are preferably regularly distributed over the assembly surface 221 (resp. 321) for best distribution of forces.

The assembly surface 221 (resp. 321) of the sleeve is secured by bolting to an assembly surface 421 of the motor casing 410, the casing 410 being adapted to form a supporting frame for the motor able to withstand the forces applied by the chassis of the machine on the motor and to ensure rigid connection between the two sleeves.

The assembly surface 421 is located on a crown 420 of the casing 410 of the motor 400, which preferably at least partly follows the contour of the outer surface of the motor as is the case in FIGS. 1a and 1b.

The assembly surface 421 also has through holes 422 adapted to be positioned opposite the holes 222 and 322 of the assembly surfaces of the sleeves 200 and 300.

Finally according to the invention, the means for assembling the sleeves 200 and 300 onto the motor 400 allow the assembly of these elements over a certain center distance range of the sleeves.

For this purpose, several embodiments of the holes 222, 322 and 422 can be envisaged.

Bolting can be achieved using screw-nut systems in which case the holes 222, 322 and 422 are through holes. In addition, either the holes 222 and 322, or the holes 422 of the motor casing may be of oblong shape or have a larger diameter than the diameter of the screws used.

Alternatively, the holes 422 may be through holes and have an oblong shape or a larger diameter than the diameter of the screws used, and the holes 222 and 322 may be tapped to ensure the retaining of a single screw.

The holes that are oblong or of larger diameter than the screws used may have a cross-section or a diameter of the order of 24 mm, whilst the screws have a diameter of 22 mm, allowing adjustment of the screws over a range of 2 mm. This range corresponds to a center distance range of the sleeves i.e. the distance between the axes 201, 301 of the sleeves.

Therefore the two sleeves 200, 300 can be secured to the motor over a first center distance range, allowing adjustment of the center distance so that it exactly corresponds to the center distance of the fork arms 120, 130.

This facilitates the machining and mounting of the assembly. There is effectively no longer any need to provide for major clearance to allow good sliding of the sleeves 200, 300 on the arms 120, 130 to offset the discrepancies of spacing or parallelism of the arms 120, 130. These discrepancies are solved by adapting the positioning of the sleeves 200, 300 at the time of assembly and not their dimensions at the time of machining.

This also makes it possible to avoid the need for high tolerances which are costly both for the transverse element 140 and for the sleeves 200, 300.

With reference to FIG. 4, the suspension assembly is illustrated installed on the hub of a wheel R of the machine. In one particular embodiment, the sleeves 200, 300 and the arms 120, 130 are tilted at an angle α relative to the plane of the wheel. In other words, the plane P1 in which the axes 121, 131 of the arms and those 201, 301 of the sleeves are contained is tilted at an angle α relative to the plane of the wheel. This allows the point projection on the ground of the shaft 110 to be close to the center of the application of forces by the wheel onto the ground. This reduces the steering forces to be transmitted to the wheel as well as wear of the ground and of the tire.

Yet, according to this particular embodiment, the motor 400 is of cylindrical shape, whose axis is coaxial with the axis of rotation of the wheel R, e.g. horizontal, and the assembly surfaces 421 of the motor and those 221 and 321 of the sleeves are parallel to the plane of the wheel, and therefore the angle of incline α of the sleeves must be offset relative to this plane.

Figure 4A:
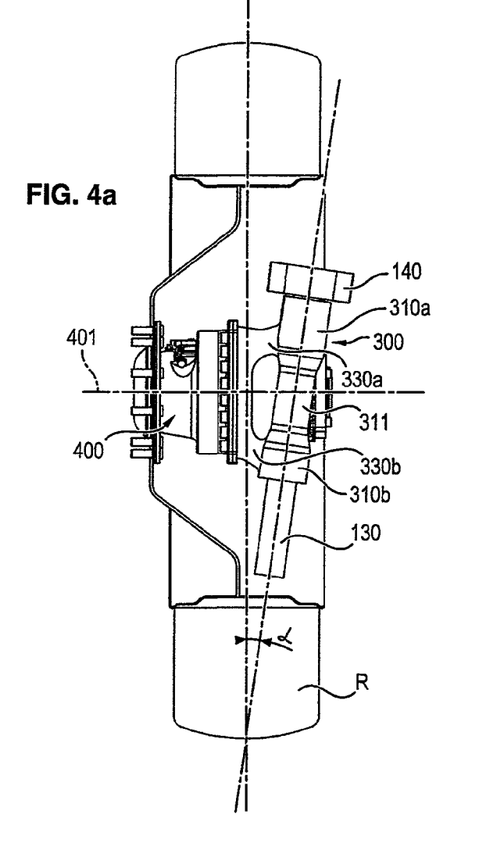
Figure 4B:
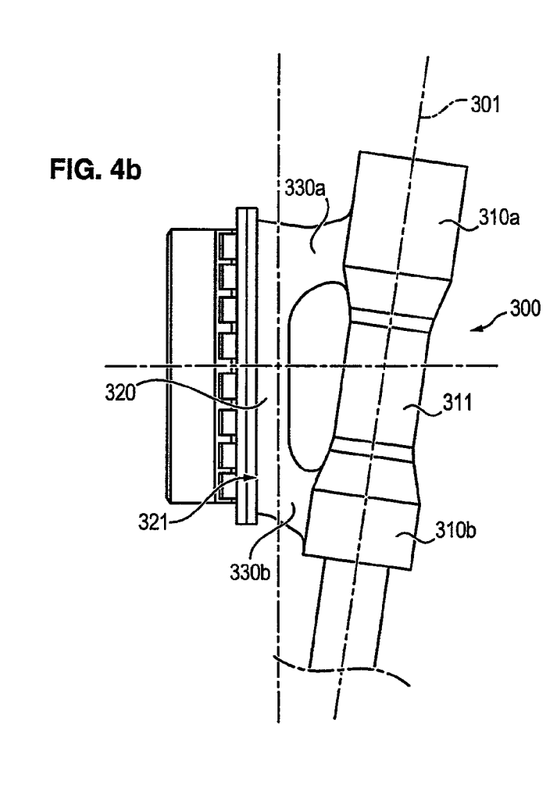
FIGS. 4b and 4d illustrate, respectively, the detail of the first embodiment of FIG. 4a and the detail of the second embodiment of FIG. 4c.

To do so, the bridges connecting each sleeve 200, 300 to its corresponding assembly surface 221, 321 may be of two different lengths as shown in FIGS. 4a and 4b.

Figure 4C:
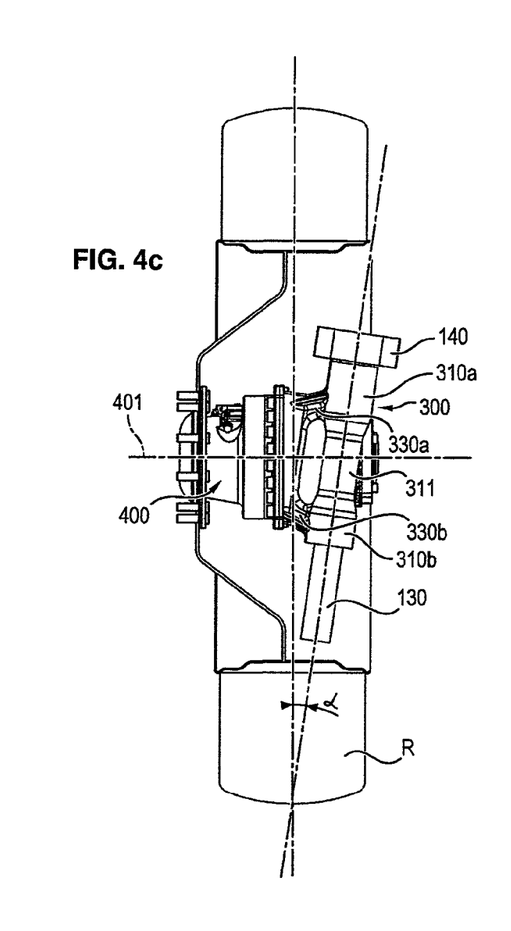
Figure 4D:
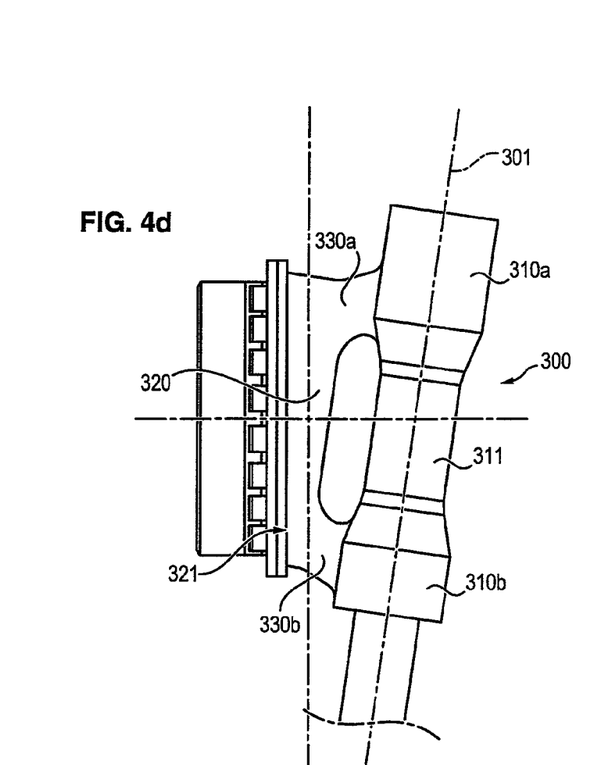

Alternatively, as shown in FIGS. 4c and 4d, the bridges 230, 330 connecting each sleeve 200, 300 to its corresponding assembly surface 221, 321 may have the same length, and the supporting part 220 (resp. 320) of the assembly surface 221 (resp. 321) may then have two different thicknesses at the junctions with the bridges 230, 330, the said junctions being located on the side opposite the supporting part 220 relative to the surface assembly 221.

Finally, according to one preferred embodiment, the sleeves 200 and 300 may also be connected by additional part 500. This part 500 is advantageously positioned at an upper part of the sleeves 200, 300, for example at a slide bearing 210A, 310A located at an upper end of the corresponding sleeve 200, 300. Alternatively, it may be positioned at a lower or median part of the sleeves 200, 300, on the side of the sleeves where the motor is positioned or on the other side.

The part 500 extends between the two sleeves 200, 300 over a center plane P2 perpendicular to the axis X-X of the sleeves 200, 300, and has a main dimension along a longitudinal axis Y-Y contained within this plane P2, and perpendicular to the two sleeves. This part 500 may be in the form of a bar for example or a plate. It may be a foundry part for example in cast iron or steel.

Advantageously, the sleeves 200 and 300 have at least one projecting support plate 240 (resp. 340), this support plate 240 (resp. 340) comprising at least one surface 241 (resp. 341) perpendicular to the axis X-X, adapted to form at least a partial bearing surface for the part 500. Therefore, it is preferably located at the part 500, for example at a slide bearing of the sleeve.

The surface 241 may be an upper surface of the support plate 240. This support plate may be made in a single piece with or mechanically welded to the sleeve.

If the sleeves 200 and 300 each comprise two slide bearings 210A, 210B and 310A, 310B positioned at the ends of each of the sleeves, they may also—when still in the form of a crude foundry sleeve 250 and before machining—have two projecting support plates 254A, 254B located at the ends thereof. When applicable, each of the support plates is positioned at the slide bearings, in a symmetrical arrangement relative to a plane passing through the middle of the sleeve and perpendicular to the axis of the sleeve. In this configuration, the two sleeves 200, 300 are identical before machining and may be formed using a single mold. This simplifies and reduces the production cost of the sleeves since the number of molds used is reduced by one half.

Finally, machining allows differentiation between a left sleeve and a right sleeve. Illustrations of different embodiments of sleeves before and after machining are shown in FIGS. 5a and 5b. The sleeve in crude form 250 lies in the center, and the differentiated left 200 and right 300 sleeves are respectively shown on the left and right.

In the course of machining, the support plates used to support the pre-positioning part 500 such as the support plates 240A, 340A for example, are machined to form a bearing surface 241, 341 for the pre-positioning part 500, and the other plates 240B, 340B are eliminated to lighten the part.

Finally, as seen previously, the part supporting the sleeves 220, 320 may have two different thicknesses at the junctions with the bridges 230A, 230B, 330A, 330B, to offer a bearing surface 221, 321 for the motor 400 tilted at an angle α relative to the plane P1.

If the two sleeves are cast in one same mold, the supporting part 252 initially at every point has a greater thickness than the maximum thickness that it may have after machining. It is the machining performed subsequently which allows the desired thicknesses to be obtained at the junctions of the bridges in each of the left and right supporting surfaces.

In addition, the support plates 240 (resp. 340) and the part 500 comprise assembly means comprising holes 242 (resp. 342) perpendicular to the assembly surface 241 (resp. 341) and holes 510 perpendicular to the center plane P2 of the part 500 allowing assembly by bolting of the part 500 and the assembly surfaces 241, 341.

According to one particular embodiment, the assembly is achieved by screw-nut systems, and the holes 242 (resp. 342) and 510 are through holes. In this case, the holes 242 (resp. 342) or the holes 510 are oblong, allowing adjustment of the relative positions of the support plates 240 (resp. 340) and of the part 500.

Alternatively, the holes 510 of the part 500 are through holes and they are oblong, and the holes 242 (resp. 342) are tapped to ensure the retaining of a single screw.

Therefore the part 500 allows the securing of the two sleeves 200 and 300 over a second center distance range of the sleeves.

The oblong holes may have a cross section of the order of 15 mm, and the screws used may have a diameter of 14 mm allowing the adjustment thereof over a range of 1 mm. Therefore the distance between the axes 201, 301 of the sleeves 200, 300 may vary over a second center distance range.

According to an alternative embodiment, the center distance ranges of the assembly means between the sleeves 200, 300 and the motor 400 firstly and the sleeves and the pre-positioning part 500 secondly may be equal to 1 mm for example.

Therefore this part 500 allows pre-positioning of the sleeves, since it allows their spacing to be adjusted for adaptation to any defects of parallelism or spacing of the arms 120, 130, before the assembly of the sleeves 200, 300 onto the motor 400.

In addition, the assembly by bolting of the pre-positioning part 500 onto the support plates 240, 340 of the sleeves allows the orienting of the sleeves 200, 300 relative to one another around the respective arms 120, 130 before they are assembled onto the motor 400.

To further facilitate this orientation of the sleeves 200, 300 relative to one another, the support plates 240, 340 may have projecting indexing tabs 243, 343 that are aligned for example parallel to the axis Y-Y. In this case, the pre-positioning part 500 on the underside thereof has a mating groove. In this manner, once the pre-positioning part 500 is in position on the support plates 240, 340, it is known that the sleeves 200, 300 are properly oriented relative to one another and in position to receive the motor 400. Preferably, provision is made for an adjusting clearance between the tabs and the mating groove, so as that there subsists rotational clearance for the sleeves 200, 300 on the arms 120, 130.

Figure 6A:
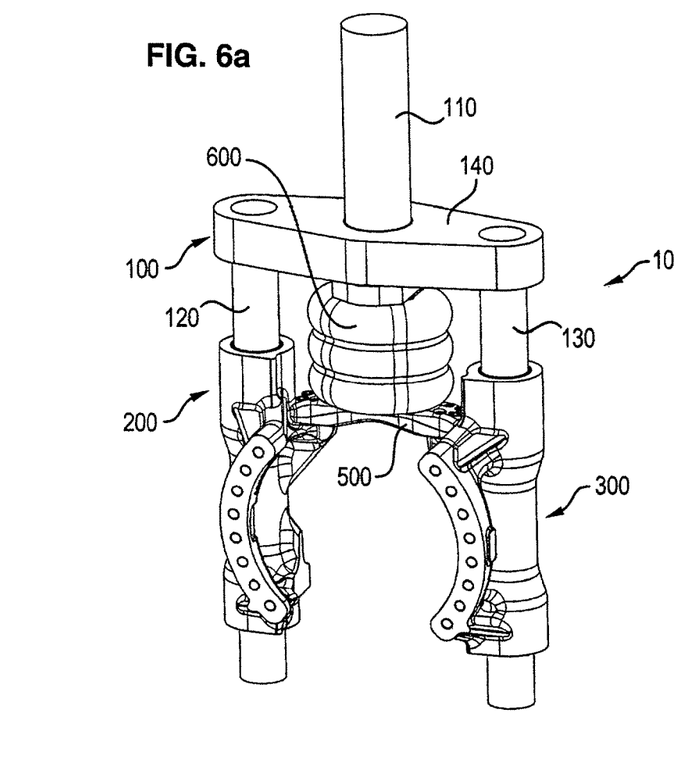
FIGS. 6a and 6b illustrate two particular embodiments of the suspension support in the suspension element according to the invention.

Finally, the pre-positioning part 500 is preferably secured to a damping member 600 which may be of spring of hydraulic cylinder type, or of pneumatic damper type as illustrated for example in FIG. 6a. The damping member 600 ensures the transmission of suspension forces to the assembly formed by the sleeves and the motor. This damping member 600 is also connected to the transverse element 140 of the fork 100.

Figure 6B:
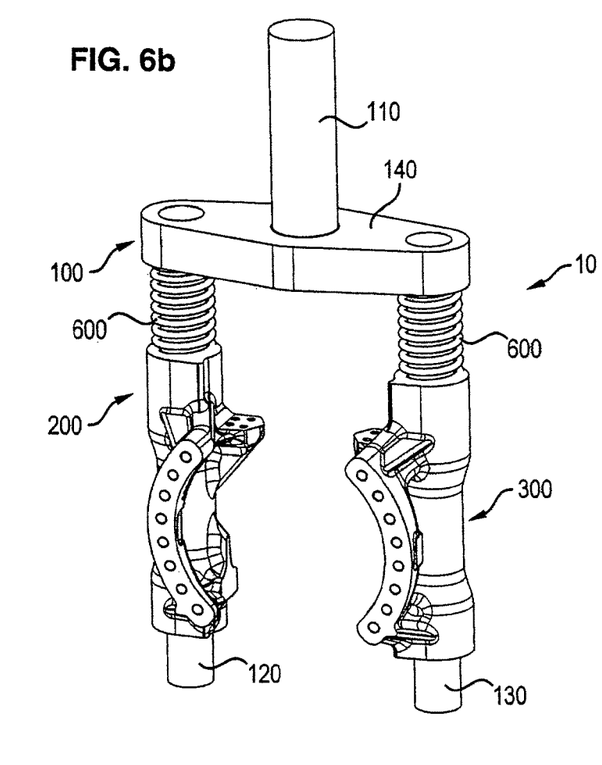

Alternatively, the bearing of the suspension is not on the pre-positioning part 500 but on the sleeves or on the motors. As an example illustrated in FIG. 6b, a damping member 600 such as a spring can connect the transverse element 140 with the sleeves to ensure bearing of the suspension on the sleeves.

With reference to FIGS. 7a to 7e, a description is now given of a method for mounting a suspension element according to the present invention.

At a first step, two sleeves 200, 300 are placed on the two arms 120, 130 of a suspension fork 100.

The positioning of these two sleeves 200, 300 is then adjusted around the arms 120, 130 on which they are placed so that they are symmetrical relative to a plane P3 located at equidistance from the arms 120, 130, and perpendicular to the plane P1 defined by the axes 121, 131 of these arms 120, 130. Preferably the sleeves 200, 300 are oriented around the arms so that the support plates 240 and 340 are directed towards the plane P3 and are therefore in position to receive the pre-positioning part 500.

Figures 7A, 7B:
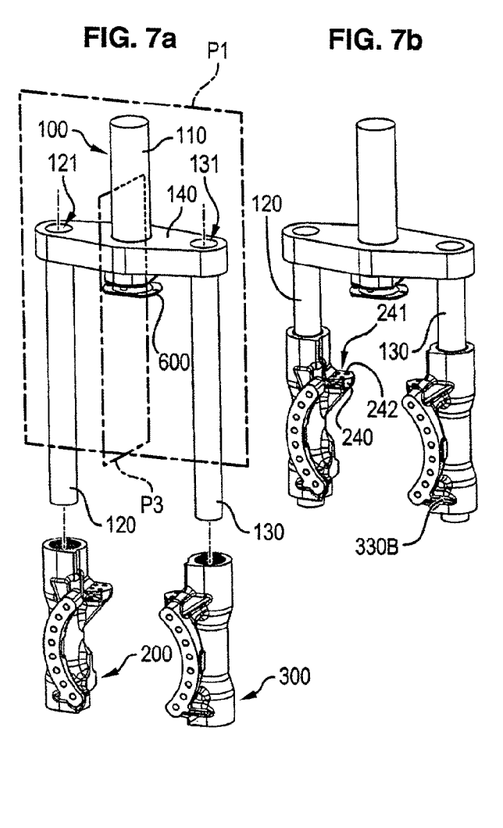
FIGS. 7a to 7e illustrate different steps for the mounting of a suspension element according to one embodiment of the invention.
Figure 7C:
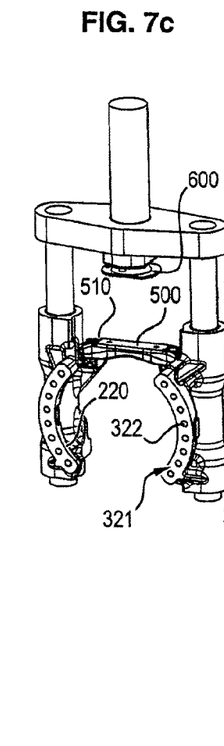
Figures 7D, 7E:
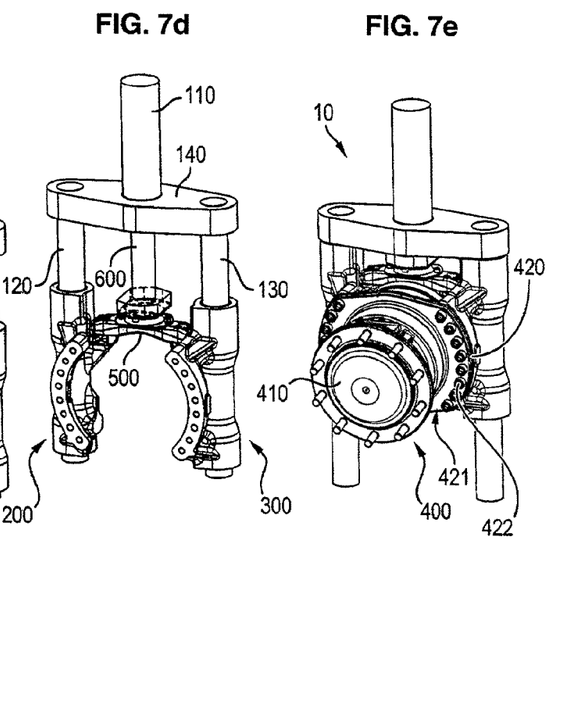

As illustrated in FIG. 7b, the respective arrangements of the support plates 240, 340 and of the motor supporting parts 220, 320, are chosen so that, once the sleeves are positioned to receive the pre-positioning part 500, they are also able to receive the motor 400.

Once the sleeves 200, 300 are in position, they are secured to the pre-positioning part 500 by bolting without tightening. By <<without tightening>>, it is meant that they are not secured in sufficiently robust manner to withstand the forces they would undergo when the machine is in operation. At the time of assembly, the oblong holes previously described allow the assembling of the sleeves 200, 300 as per the center distance determined by the cylindrical arms 120, 130. In addition, the pre-positioning of the sleeves 200, 300 obtained by bolting of the part 500, makes it possible to the nearest clearance to obtain ideal orienting of the sleeves at an angle around the arms 120, 130 and height-wise along these arms for easy receiving of the motor 400.

The sleeves 200, 300 are therefore held secured to and in position on the arms 120, 130, and the motor 400 can be assembled without tightening onto the motor supporting parts 220, 320. This operation is largely facilitated by the fact that the sleeves are suitable positioned and held in position by the part 500. Once again, the assembly of the motor 400 onto the sleeves 200, 300 can be achieved in accordance with the center distance of the cylindrical arms 120, 130, by means of the holes mentioned above and provided for this purpose. Since the pre-positioning part 500 has been assembled without tightening, slight sliding of this part on the sleeves 200, 300 is possible for adapting to the definitive position of the sleeves on the motor 400.

The motor 400 can then be tightened on the sleeves 200, 300 to the torque which allows such tightening to withstand the forces transmitted by the chassis of the machine to the motor 400 when in operation.

Finally, the pre-positioning part 500 can similarly be tightened on the sleeves to the torque which allows definitive retaining thereof to preserve the memory of sleeve positioning.

A method has therefore been described for assembling a suspension element that is simplified for those skilled in the art.

In addition, ideal centering of the sleeves is obtained on the arms 120, 130 without any restraining or residual constraint, which allows optimal sliding and prevents early wear of the slide surfaces.

In addition, in the event of servicing of the machine on which the suspension element is mounted, the present invention largely simplifies the dismounting and re-assembling of the motor 400.

It is possible to carry out work such as maintenance work or cleaning for which the motor 400 is removed, whilst holding the sleeves 200, 300 secured by the pre-positioning part 500. This part 500 therefore preserves the memory of the spacing of the sleeves 200, 300 and maintains their position.

When reintegrating the motor 400 with the suspension element 10, all that is required is to re-assemble the motor 400 by bolting onto the sleeves 200, 300, and then to tighten this assembly so as to ensure sufficient robustness when the machine is in operation.

The invention claimed is:

1. A suspension element (10) for a self-propelled machine, comprising:
   a suspension fork (100) configured to be secured to a chassis of the machine, and comprising two substantially parallel arms (120, 130),
   two sleeves (200, 300) each comprising at least one slide bearing (210A, 210B, 310A, 310B) adapted to separately slide in translation on the arms (120, 130) and an assembly surface (221, 321) having at least one first hole,
   a hydraulic motor (400) including a casing (410) configured to form an assembly having at least one second hole, said at least one first hole and said at least one second hole for directly connecting the assembly to the assembly surface of each of the two sleeves, wherein one of said at least one first hole and said second hole has an oblong cross section or diameter larger than a bolt used to directly connect said assembly surface to said assembly, said larger hole for offsetting discrepancies of spacing or parallelism of the arms (120, 130) to allow positioning of the sleeves (200, 300) at a time of securing of said suspension fork to said chassis,
   wherein the arms (120, 130) are centered on parallel axes (121, 131), wherein the suspension fork further comprises a part (500) extending between the two sleeves (200, 300) over a center plane P2 perpendicular to the parallel axes (121, 131) of the arms, and having a main dimension along an axis Y-Y contained in the center plane P2 and perpendicular to the two sleeves (200, 300), said part configured to be coupled to the two sleeves (200, 300) by a second assembly comprising at least one third hole allowing assembly by bolting to at least one of the sleeves (200, 300), the part (500) forming a pre-positioning element for the sleeves (200, 300).

2. The suspension element according to claim 1 wherein said at least one third hole is located on the pre-positioning element.

3. The suspension element according to claim 1, wherein the sleeves (200, 300) have at least one projecting support plate (240, 340) comprising at least one support surface (241, 341) perpendicular to an axis X-X, said support plate forming a support for the pre-positioning element.

4. The suspension element according to claim 3, wherein each sleeve (200, 300) comprises two of said slide bearings.

5. The suspension element according to claim 4 wherein the slide bearings (210A, 210B, 310A, 310B) are positioned at the ends of the sleeves, and each sleeve (200, 300) has a circular cross section whose outer diameter varies longitudinally along the sleeve, the outer diameter being larger at the ends than in the middle of the sleeve, so that the sleeve is flared at its ends.

6. The suspension element according to claim 3, wherein the second assembly comprises at least one fourth hole (242, 342) located on each support plate of the sleeves (200, 300), allowing assembly by bolting of the sleeves onto the pre-positioning element.

7. The suspension element according to claim 1 further comprising a damping member (600) connecting the suspension fork (100) and at least one of the parts of the suspension element (10).

8. The suspension element according to claim 7 wherein the damping member (600) connects the suspension fork (100) to the pre-positioning element extending between the two sleeves (200, 300).

9. The suspension element according to claim 1 wherein each sleeve (200, 300) includes a motor supporting part (220, 320) comprising said assembly surface (221, 321).

10. The suspension element according to claim 9, wherein the assembly surface (221, 321) of the motor supporting part extends over a plane oriented at an angle α relative to a plane P1 defined by parallel axes (121, 131) on which the arms (120, 130) of the fork (100) are respectively centered.

11. The suspension element according to claim 10, wherein each motor supporting part (220, 320) includes two bridges (230A, 230B, 330A, 330B) of different lengths, allowing a tilting of said assembly surface at an angle α relative to the plane P1.

12. The suspension element according to claim 10, wherein each motor supporting part (220, 320) includes two bridges (230A, 230B, 330A, 330B) of equal length, and has two different thicknesses at connecting points of the two bridges allowing a tilting of the assembly surface at an angle α relative to the plane P1.

13. The self-propelled machine comprising the suspension element (10) according to claim 1.

14. A method for assembling the suspension element of the self-propelled machine according to claim 1 comprising the steps of:
bringing said two sleeves (200, 300), onto said two parallel arms (120, 130) of the suspension fork (100), adjusting the positioning and orientation of each said sleeve (200, 300) around the arm on which it is positioned, so that the two sleeves lie in a symmetrical position relative to a plane P3 perpendicular to a plane P1 defined by parallel axes (121, 131) on which the parallel arms (120, 130) are respectively centered, the plane P3 lying between the arms (120, 130), support plates (240, 340) of the sleeves being positioned toward the plane P3,
securing the two sleeves (200, 300), without tightening, by assembling them onto the pre-positioning element,
securing the hydraulic motor (400), without tightening, onto each of the two sleeves (200,300),
further securing the motor (400) on the sleeves (200,300) by tightening said motor onto each of the sleeves so as to allow the transmission of forces from the chassis of the machine to the motor casing when the machine is in operation,
achieving definitive tightening of the pre-positioning element on the sleeves, at a torque allowing its definitive holding in position, so as to maintain memory of the positioning of the sleeves.

15. The method for assembling a suspension element (10) of the self-propelled machine according to claim 14, further comprising temporarily removing the motor to carry out maintenance, the pre-positioning element being held in position throughout the maintenance operation thereby preserving the adjusted positioning of the sleeves (200, 300).

16. A suspension element (10) for a self-propelled machine, comprising:
a suspension fork (100) configured to be secured to a chassis of the machine,
two bearings (210A, 210B, 310A, 310B) adapted to separately slide in translation on respective substantially parallel arms (120, 130) and
two sleeves (200, 300) comprising an assembly surface (221, 321) having at least one first hole,
a motor (400) including a casing (410) configured to form an assembly having at least one second hole, said at least one first hole and said at least one second hole for directly connecting the assembly to the assembly surface of each of the two sleeves, wherein one of said at least one first hole and said second hole has an oblong cross section or diameter larger than a bolt used to directly connect said assembly surface to said assembly, said larger hole for offsetting discrepancies of spacing or parallelism between the arms (120, 130) and the bearings to allow positioning of the sleeves (200, 300) at a time of securing of said suspension fork to said chassis,
wherein the arms (120, 130) are centered on parallel axes (121, 131), wherein the suspension fork further comprises a part (500) extending between the two sleeves (200, 300) over a center plane P2 perpendicular to the parallel axes (121, 131) of the arms, and having a main dimension along an axis Y-Y contained in the center plane P2 and perpendicular to the two sleeves (200, 300), said part being assembled onto the two sleeves (200, 300) by a second assembly comprising at least one third hole allowing assembly by bolting to at least one of the sleeves (200, 300), the part (500) forming a pre-positioning element for the sleeves (200, 300).

17. A suspension element (10) for a self-propelled machine, comprising:
a suspension fork (100) configured to be secured to a chassis of the machine, and comprising two substantially parallel arms (120, 130),
two sleeves (200, 300) each comprising at least one bearing (210A, 210B, 310A, 310B) adapted to separately slide in translation on the arms (120, 130) and an assembly surface (221, 321) having at least one first hole, a motor (400) including a casing (410) configured to form an assembly having at least one second hole, said at least one first hole and said at least one second hole for directly connecting the assembly to the assembly surface of each of the two sleeves, wherein one of said at least one first hole and said second hole has an oblong cross section or diameter larger than a bolt used to directly connect said assembly surface to said assembly, said larger hole for offsetting discrepancies of spacing or parallelism of the arms (120, 130) to allow positioning of the sleeves (200, 300) at a time of securing of said suspension fork to said chassis, wherein the bearings are centered on parallel axes (121, 131), wherein the suspension fork further comprises a part (500) extending between the two sleeves (200, 300) over a center plane P2 perpendicular to the parallel axes (121, 131) of the arms, and having a main dimension along an axis Y-Y contained in the center plane P2 and perpendicular to the two sleeves (200,300), said part being assembled onto the two sleeves (200, 300) by a second assembly comprising at least one third hole allowing assembly by bolting to at least one of the sleeves (200, 300), the part (500) forming a pre-positioning element for the sleeves (200, 300).

\* \* \* \* \*